(12) United States Patent
Forutanpour

(10) Patent No.: US 10,939,984 B2
(45) Date of Patent: Mar. 9, 2021

(54) APPARATUS, SYSTEM, AND METHOD FOR STORING BABY TEETH

(71) Applicant: Babak Forutanpour, Carlsbad, CA (US)

(72) Inventor: Babak Forutanpour, Carlsbad, CA (US)

(73) Assignee: Babak Forutanpour, Carlsbad, CA (US)

( * ) Notice: Subject to any disclaimer, the term of this patent is extended or adjusted under 35 U.S.C. 154(b) by 41 days.

(21) Appl. No.: 16/270,030

(22) Filed: Feb. 7, 2019

(65) Prior Publication Data

US 2020/0022794 A1    Jan. 23, 2020

Related U.S. Application Data

(60) Provisional application No. 62/700,039, filed on Jul. 18, 2018.

(51) Int. Cl.
*A61C 19/00* (2006.01)
*A47G 1/12* (2006.01)

(52) U.S. Cl.
CPC .............. *A61C 19/008* (2013.01); *A47G 1/12* (2013.01)

(58) Field of Classification Search
CPC .............. A61C 19/008; A61C 2002/00; A61C 2202/00; A61C 19/02; A47G 1/12

USPC .......................................................... 206/83
See application file for complete search history.

(56) References Cited

U.S. PATENT DOCUMENTS

| | | | | | |
|---|---|---|---|---|---|
| 3,353,657 | A | * | 11/1967 | Young | G09F 5/02 206/755 |
| 4,694,956 | A | * | 9/1987 | Sims | A61C 19/008 206/527 |
| 5,501,602 | A | * | 3/1996 | Anderson | A61C 19/008 206/0.81 |
| 5,522,507 | A | * | 6/1996 | Cruz | A61C 19/008 206/575 |
| 5,575,028 | A | * | 11/1996 | Brau | A47G 9/1045 446/296 |
| 5,621,990 | A | * | 4/1997 | Blanchard | A61C 19/008 206/83 |
| 5,957,275 | A | * | 9/1999 | Lemaire | A45C 11/26 206/83 |
| 2013/0168287 | A1 | * | 7/2013 | James | B65D 5/504 206/763 |

* cited by examiner

*Primary Examiner* — Steven A. Reynolds

(57) ABSTRACT

An apparatus, method, and system are described for unique storage of baby teeth. The disclosed embodiments describe a storage unit that may have a removable (or removably secure) cover and a base. A baby tooth storage kit may include the storage unit adapted to house tubes that may store baby teeth together with their corresponding "tooth fairy" note. The kit may also be adapted to store a writing implement and a plurality of notes. Also, described herein is a unique game or instruction set for using the kit in an original way if so desired.

8 Claims, 5 Drawing Sheets

APPARATUS, SYSTEM, AND METHOD FOR STORING BABY TEETH

I. CLAIM TO PRIORITY UNDER 35 U.S.C. § 119

The present application for patent claims the benefit of U.S. Provisional Application No. 62/700,039 filed on Jul. 8, 2018, entitled, "Tooth Fairy Keepsake Doll," owned by the applicant hereof, and expressly incorporated herein by reference in its entirety.

BACKGROUND

I. Field

The disclosed embodiments relate to an apparatus, methods, and systems for storage solutions for baby teeth.

II. Background

Sentimental caregivers desire an efficient, creative, easy and fun way to store baby teeth and the corresponding notes written to the "tooth fairy." There is a need in the art for baby teeth storage apparatuses, systems, and methods that can store the note alongside the tooth. There is also a need in the art to prevent the note and the corresponding tooth from becoming separated.

SUMMARY

Methods, apparatuses, and systems for storing baby teeth are described. In an embodiment, a baby tooth storage kit is described, comprising: a baby tooth storage unit comprising a base and a cover, the base adapted to house a tube holder; a plurality of tubes, each tube adapted to house a baby tooth and a note; a writing implement; a plurality of notes; and the tube holder adapted to house the plurality of tubes, writing implement, and plurality of notes.

In another embodiment, a method for uniquely storing baby teeth is described, comprising: losing a baby tooth; removing a tube from a baby tooth storage unit organizer; writing a note to the "tooth fairy;" opening the tube; placing the baby tooth and the note inside the tube; placing the filled tube under a pillow; collecting the filled tube; leaving a reward in exchange for the collected filled tube; repeating the above steps until all the desired baby teeth are collected; writing a note to the "tooth fairy" requesting all of the collected teeth back; and returning the baby tooth storage unit organizer, the organizer containing the filled tubes.

In yet another embodiment, an apparatus for storing baby teeth and a note is described, comprising: an elongated tube, the tube having two chambers, the first longer chamber located at the lower end of the tube configured to house a paper note, the second shorter chamber located at the upper end of the tube configured to house a baby tooth, the tube configured to open and close shut.

BRIEF DESCRIPTION OF THE DRAWING

The following embodiments may be better understood by referring to the following figures. The figures are presented for illustration purposes only, and may not be drawn to scale or show every feature, orientation, or detail of the embodiments. They are simplified to help one of skill in the art understand the embodiments readily, and should not be considered limiting.

DETAILED DESCRIPTION

Each of the additional features and teachings disclosed below can be utilized separately or in conjunction with other features and teachings to provide a method, apparatus, and system for storing baby teeth. Representative examples of the following embodiments, will now be described in further detail with reference to the attached drawings. This detailed description is merely intended to teach a person of skill in the art details for practicing the preferred aspects of the teachings and is not intended to limit the scope of the embodiments.

The disclosed embodiments describe an interactive baby tooth (primary tooth) storage unit, method and system. In an embodiment a child may remove the cover (or lift the lid) of the tooth storage unit and may chose the tube numbered one upon losing their first tooth. The child may then open the tube and place their tooth and their tooth fairy note inside the tube and close it. In an embodiment the child may use the baby tooth storage unit's accompanying notepad or notes and writing implement (e.g. pen, pencil, marker) to write the tooth fairy note. The child may leave the filled tube under their pillow for the "tooth fairy" (e.g. a caregiver to later collect). In an embodiment, the filled tubes are replaced inside the unit. In another embodiment, the tubes are numbered consecutively from one to twenty. In yet another embodiment the filled tubes are kept hidden and separately from the unit. In an embodiment, the separate hidden tubes may be requested by the child after the last tooth may be collected. In an embodiment the caregiver may return to the child the tooth storage unit with all the filled tubes in it. In another embodiment, a caregiver may return all the filled tubes and the child may place them back into the storage unit. In an embodiment, the child will gift the storage unit filled with tubes to the caregiver as a keepsake of their childhood.

Figure 1:
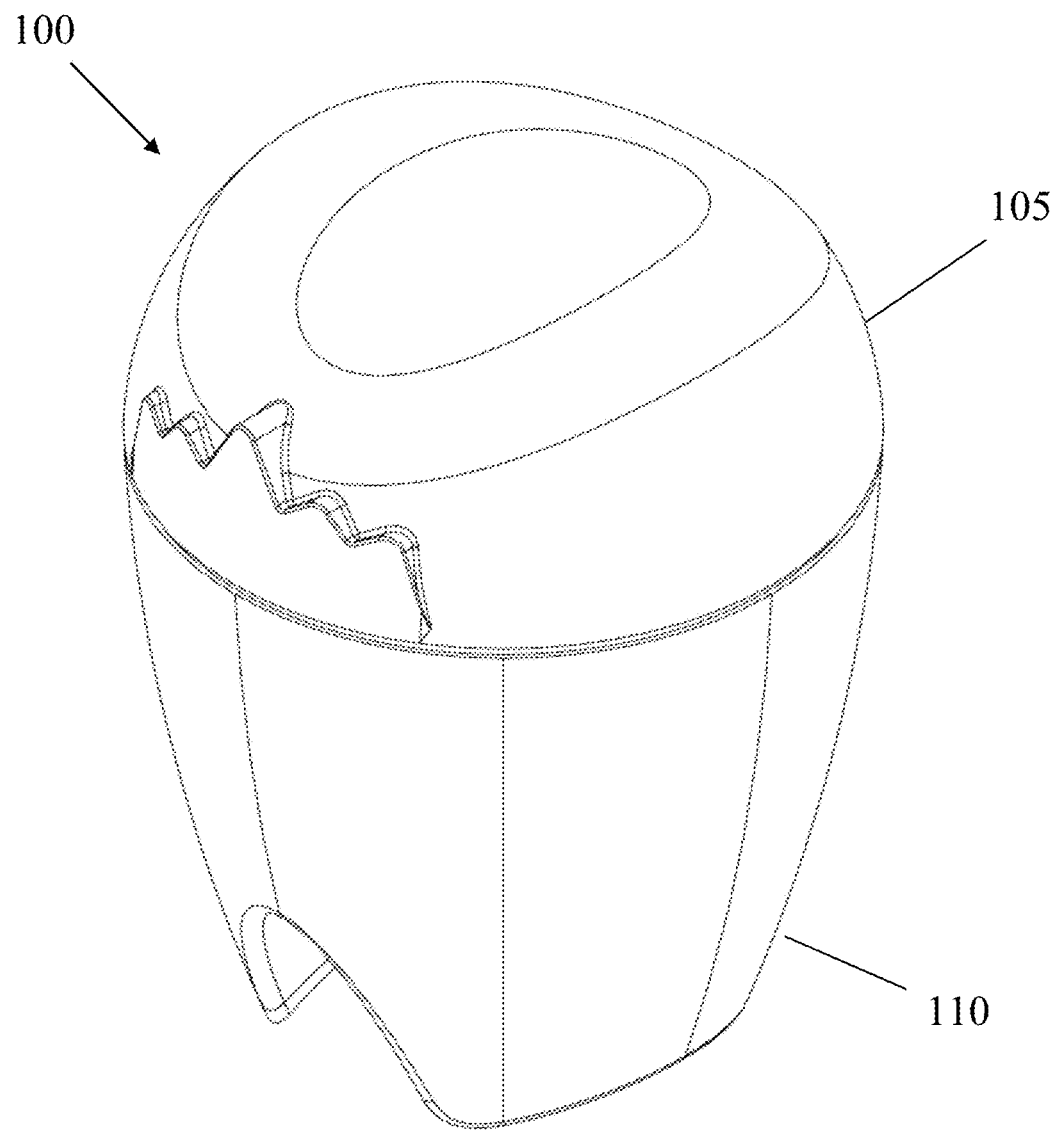
FIG. 1 illustrates a front perspective view of a tooth designed embodiment of a baby tooth storage unit.

FIG. 1 illustrates a front perspective view of a tooth designed embodiment of a baby tooth storage unit 100. The tooth storage unit 100 may resemble a giant tooth. The tooth storage unit 100 may comprise a cover (lid or cap) 105 and a base 110. In a designed embodiment the tooth shaped storage unit 100 may be further designed to comprise a caricature, eyes, smile, nose, arms, or a wand. In a designed embodiment, the tooth shaped storage unit may have a tiara or baseball cap shape on the cover 105. In an embodiment, the cover 105 may be unattached to the base 110 and completely removable. In another embodiment, the cover 105 may be hinged to the base 110, or removably attached in some manner. For example, the cover may be threaded and screwed on and off the base. Thus, the cover 105 may be removably secured to the base 110. In another embodiment, the unit 100 may be white, pink, baby blue or other colors or combination of colors. In another embodiment, the baby tooth storage unit 100 may be customized to include the child's name.

Figure 2:
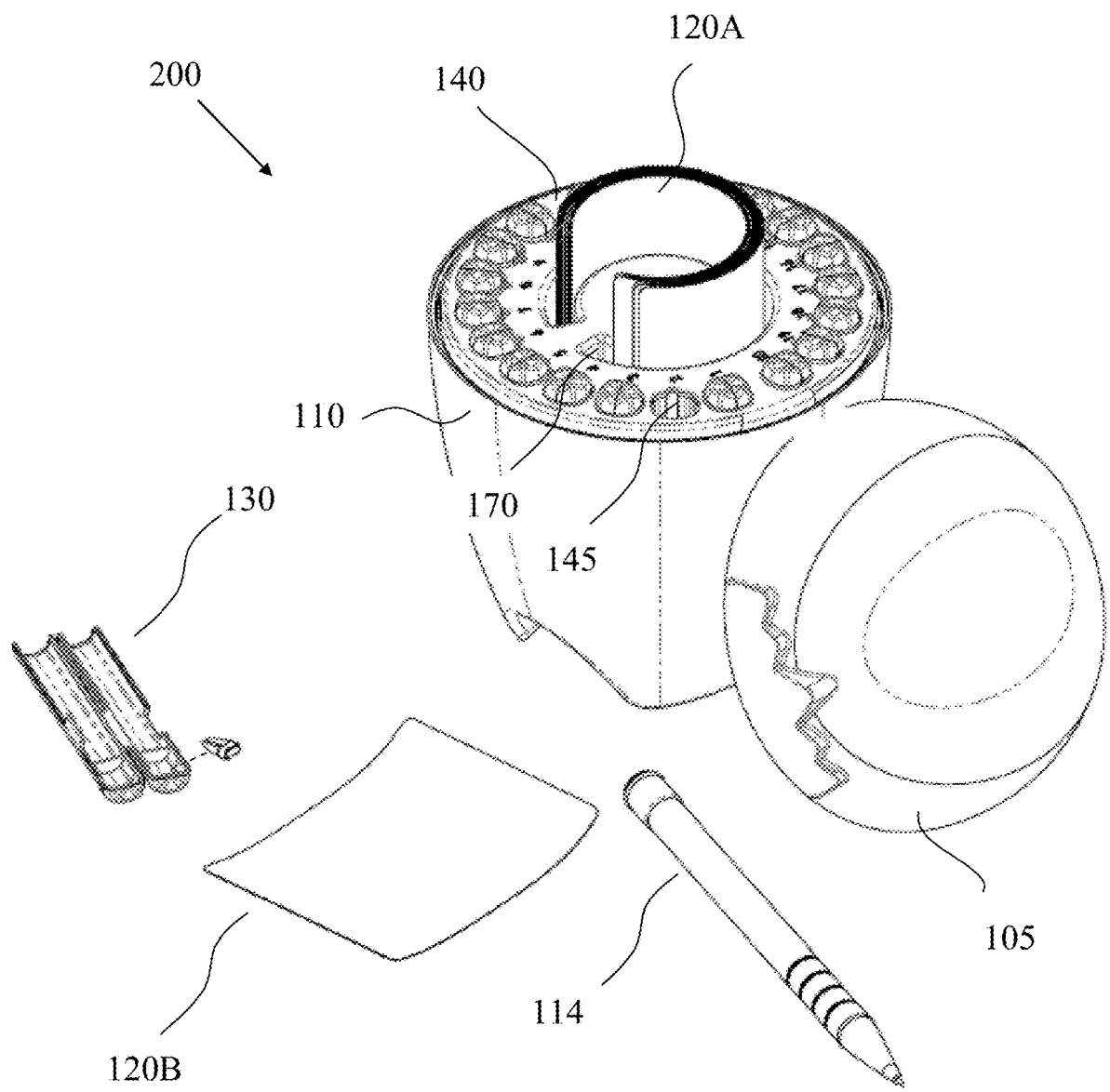
FIG. 2 illustrates an embodiment of a baby tooth storage unit kit with a cover removed.

FIG. 2 illustrates an embodiment of a baby tooth storage unit kit 200 (or baby tooth storage unit organizer) with a cover 105 removed showing the contents inside the base 110. In an embodiment, the kit 200 may include a writing implement 114. In another embodiment, the kit 200 may include paper notes 120A. The paper notes may be a note pad, lose sheets of blank paper, card stock, film coated notes, or any appropriate writing medium. In an embodiment, the kit 200 may include a plurality of notes. In another embodiment, the kit 200 may include paper notes, between 20-30 sheets such that there may be one note for each tooth, some spares, and a final note that may be used by the child to ask the tooth fairy for the tubes back. A single sheet of the paper notes 120A is illustrated as 120B. In an embodiment both the paper notes 120A and the writing implement 114 may be acid free or of keepsake quality. In an embodiment, the notes 120A may also be labeled with numbers, a space for the date, a diagram of the human mouth such that a person may mark which tooth is being written about, or with words (or a special symbol or character) numbered one through twenty to correspond with and organize the order of the teeth that fall out. In an embodiment, kit 200 may include a tube 130 or plurality of tubes 130. The tube may be configured to house a baby tooth and corresponding note. In another embodiment, the baby tooth storage unit kit 200 may include a tube holder 140. In an embodiment, the tube holder 140 may be labeled with numbers or words (or a special symbol or character) numbered one through twenty to organize the order of the teeth that fall out. In an embodiment, the tubes may also be labeled 170 with a number one through twenty. In another embodiment, only the tubes may be labeled one through twenty. In an embodiment, tube holder 140 may house a plurality of tubes 130 by way of receptors 145 located on the lateral surface of the tube holder 140. The tube holder may comprise a circular disc with cut outs (open receptors) to house the plurality of tubes 130, writing implement 114, and notes 120A. Or the tube holder 140 may have cup shaped receptors that hold the tubes. In an embodiment, twenty areas may be used to store the tubes 130 and may be arranged in a circular fashion, with ten slots representing the ten teeth in the roof of the mouth, and the other ten representing ten teeth of the bottom jaw. In another embodiment, the tube holder 140 may house the notes 120A by way of a receptor 170 located on the lateral surface of the tube holder 140.

Figure 3:
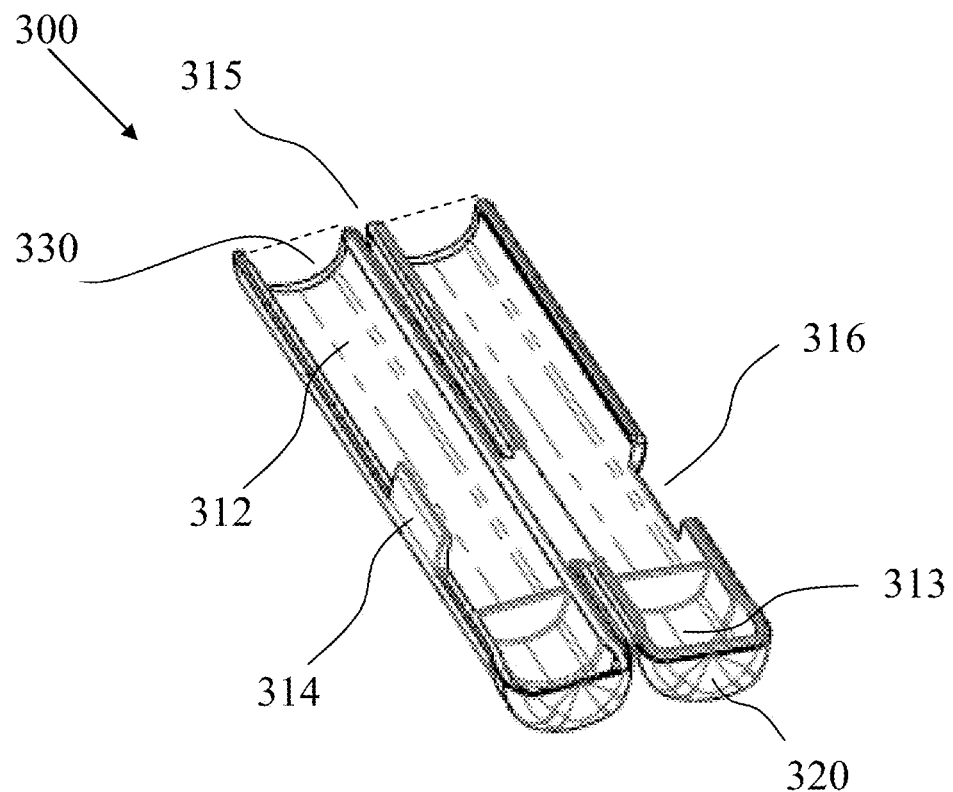
FIG. 3 illustrates an embodiment of an open empty tube.

FIG. 3 illustrates an embodiment of an open empty tube 300. In an embodiment, the tube 300 may be hinged 315. In an embodiment, a small chamber may be configured to house a baby tooth 313. In an embodiment, the baby tooth chamber 313 may be between 1 to 20 mm in length and between 1-30 mm in diameter. In an embodiment, the diameter of the chamber 313 may be 15 mm with a length of 70 mm. The tube 130 may be made of a variety of materials, including ABS plastic, PLA plastic, metal, or wood, or any combinations thereof. The hinge 315 may be thin and malleable plastic that provides the needed flexibility, or a traditional two piece hinge with rod connecting the two halves of the tube 130. In another embodiment, there may be no hinge, and the left and right half of the tube are magnetically connected or disconnected. In another embodiment, the two halves of the tube 130 may be connected with friction connectors. The tube 130 may also not have left and right halves, but rather a top and bottom portion, which are connected using methods noted above. In an embodiment, a tab 314 may allow the tube to open with some effort and shut to stay closed. For example, if a user wishes to close the tube 300, tab 314 will push against area 316, where friction and tension help keep the tube closed. In an embodiment, an elongated chamber 312 (or lower tube half) diameter may be between 1 mm to 20 mm, and its length may be 2-mm to 100 mm, be configured (adapted) to house a note such as note 120B shown in FIG. 2. In another embodiment, the top 320 of the tube 300 may be designed to resemble the top of a tooth. In another embodiment, the top 320 (lateral surfaces) of the tubes 130 may be individually designed to resemble the top of each baby tooth (not a single generic resemblance).

Figure 4:
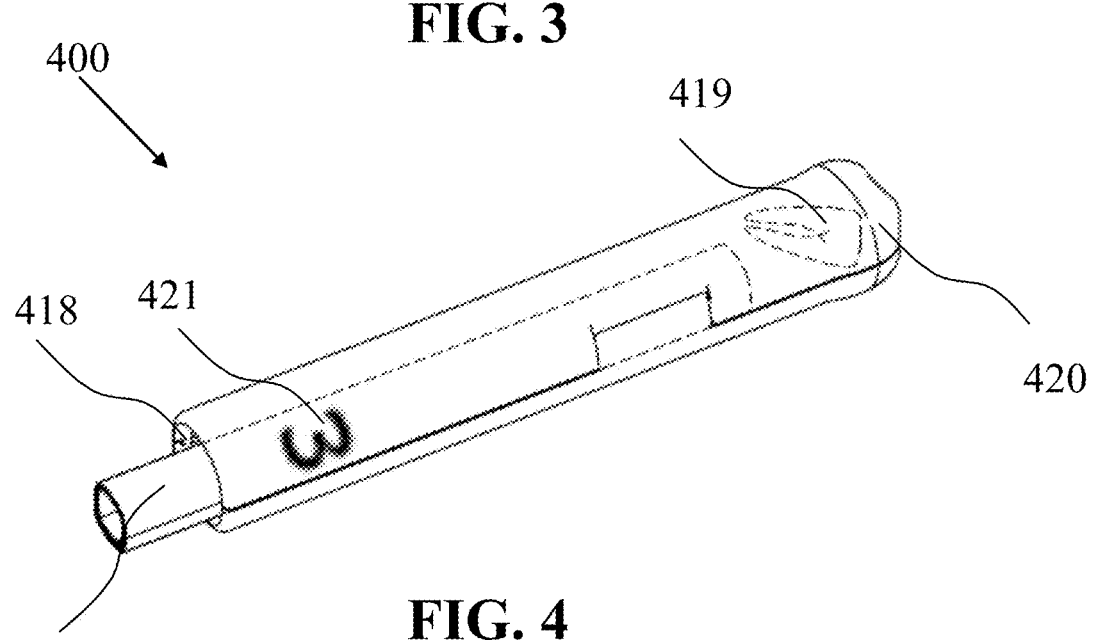
FIG. 4 illustrates an embodiment of a closed filled tube.

FIG. 4 illustrates an embodiment of a closed filled tube 400. In an embodiment, a tooth 419 and note 417, such as the note shown in FIG. 2 120B, may be rolled up after being written on and placed inside the smaller chamber 313 and elongated chamber 312 of tube 400 respectively. 421 shows a marking to indicate which tooth was lost on note 417, in this example, the number three, which would indicate this is the 3rd baby tooth the child has lost. In an embodiment, the tube 400 may have a closed bottom 330, keeping the note 417 completely incased inside the tube. In another embodiment, the bottom of the tube 400 may be open ended, whereby the tension of the tube walls on the rolled note may keep it from sliding out. A benefit of having an open ended tube bottom is that it may make it easier for some children to insert the note 417. Rolling the note 417 and pushing it up into the tube from the bottom may be preferred to placing a rolled up note 417 inside a tube 400 and then quickly having to close it shut before the note 417 may unroll. Also illustrated in FIG. 4 is shown how, in one embodiment, the opening at the bottom 418 of the tube 400 is between 1 mm and 2 mm smaller in diameter than the inner diameter of the tube, such that once the note 417 is fully inside, it may unfurl to fit within the chamber space and thus may have a difficult time falling out given the lip at the bottom 418. Another benefit of having the bottom of the tube open is that it may be able to hold larger notes such that part of the note sticks out the bottom of the tube. For example, a child may have written their note on regular notebook paper. In another embodiment, the tube 400 may be open at both ends. In another embodiment, the note may be folded (not rolled) and placed inside the tube along with the tooth. In this embodiment, the tube 400 may have a shape to accommodate this arrangement. In another embodiment, the tube 400 may be shaped spherical, hexahedron, tetrahedron, cylindrical, rectangular, or some other geometric shape. In an embodiment, the teeth may be stored not based on their location in the mouth, but chronologically.

Figure 5:
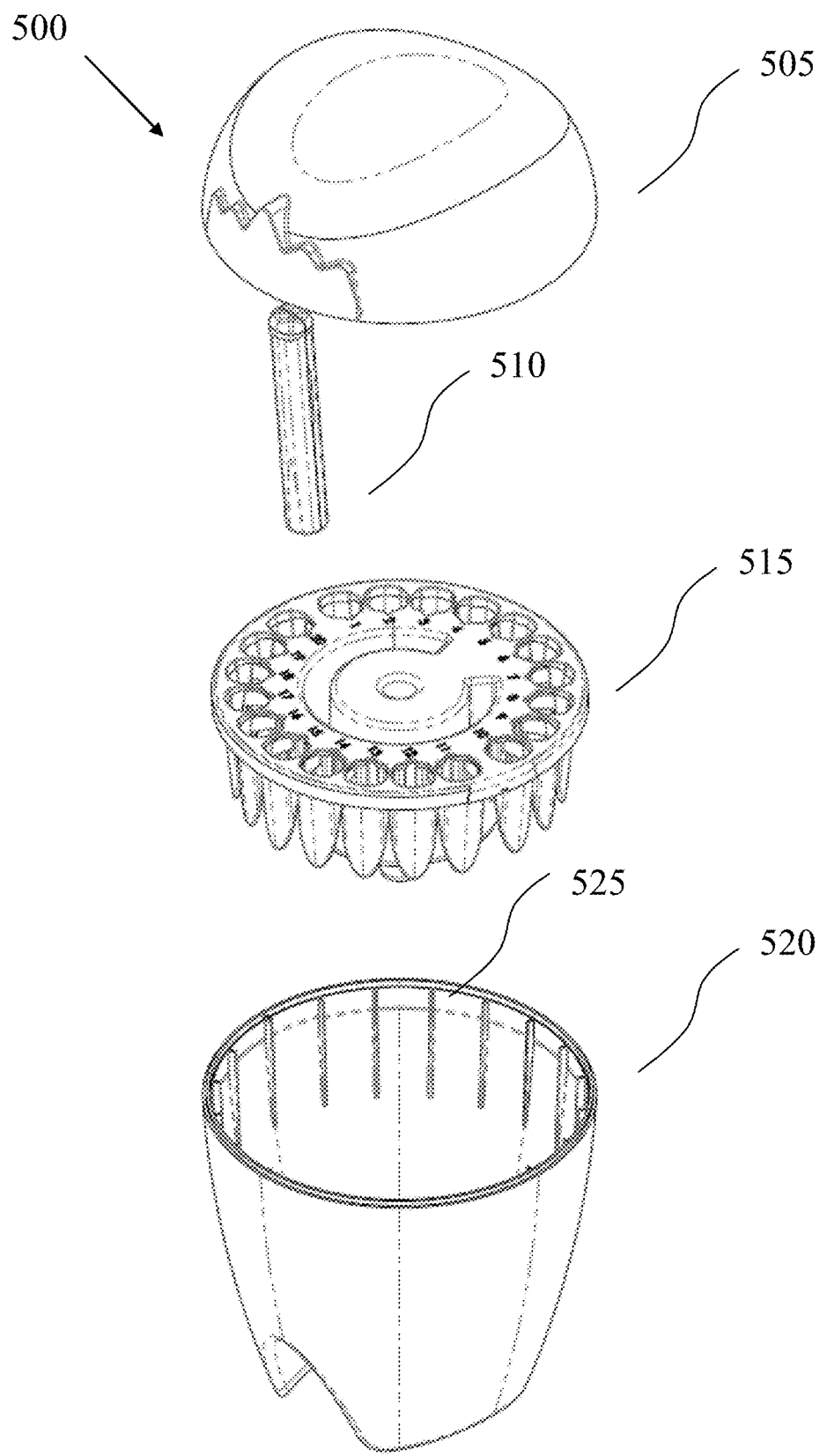
FIG. 5 illustrates an expanded view of portions of a baby tooth storage unit kit in an embodiment.

FIG. 5 illustrates an expanded view of portions of a baby tooth storage unit kit 500 in an embodiment. A removable cap (or cover or lid) 505 is shown, one of a plurality of tubes 510 is shown, a tube holder 515 is shown, and a base 520 is shown, but the cap may be removably secured to the base 520 or it may be attached to the base 520. In an embodiment, the top 420 of the tube 510 located about the area where the tooth would be stored 313 may be slightly bigger in diameter than that of the tube receptors 145 by 1 mm or more so that the tube 510 may not fall through the receptacles 145 of the tube holder 515. In other words, the lower portion of the tube 510 may slide through the receptor 145, while the top portion of the tube may not. In one embodiment, the tube holder may be asymmetrical or may have a tab or notch (keyed) 525 on one or more sides such that it does not rotate inside the base 520.

Figure 6:
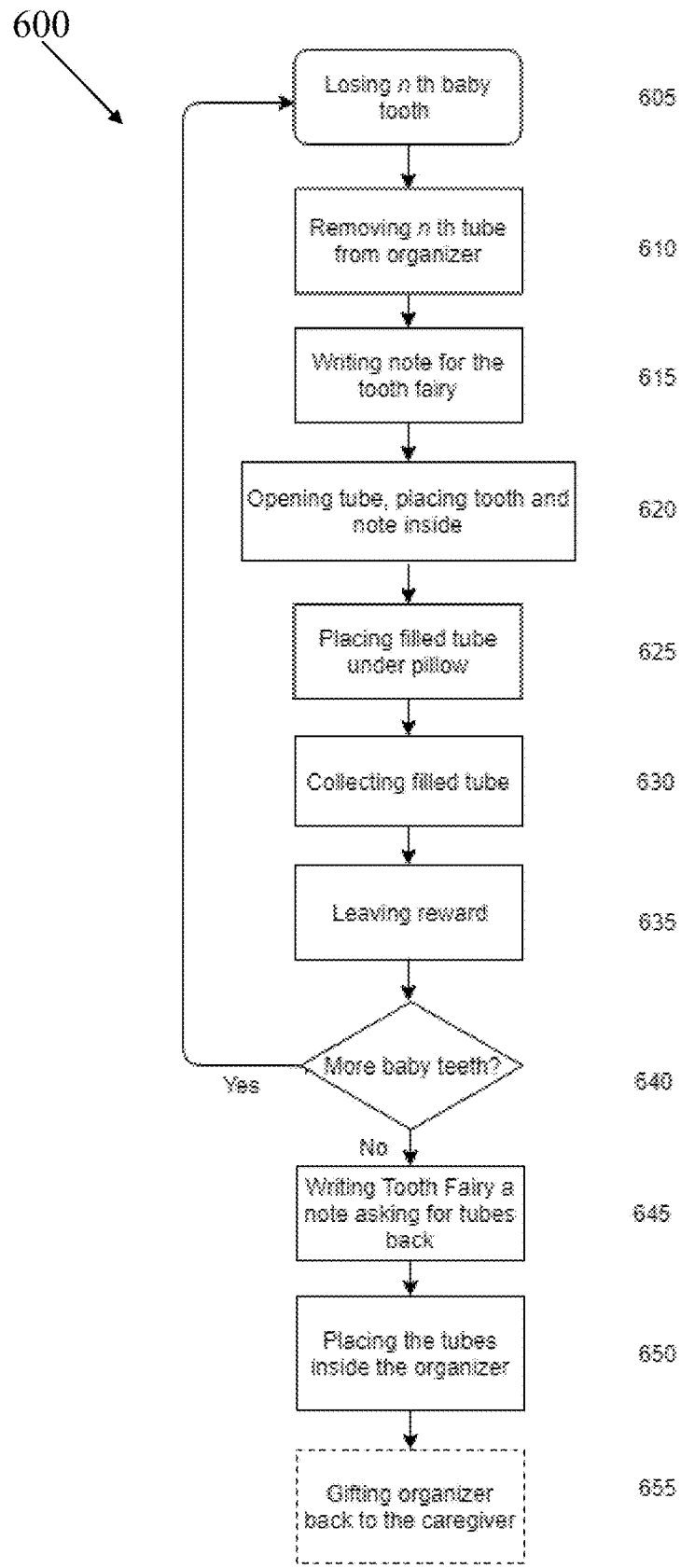
FIG. 6 illustrates a unique method of an embodiment of the system being used by a caregiver ("tooth fairy") and child.

FIG. 6 illustrates a unique method 600 of an embodiment of the system being used by a caregiver (tooth fairy) and child. In an embodiment, the method 600 may be included in kit 200 as a unique game or set of instructions. The unique and interactive game described herein adds to and improves families' tooth fairy traditions. The unique method, uses non-conventional unique steps. First at step 605 a child loses a tooth, starting with their first one. At step 610 the child may remove the first tube from the baby tooth storage unit organizer: such as tube 130 as shown in FIG. 2. Next, at step 615, in an embodiment, using the provided note paper 120A and writing implement 114 from the baby tooth storage unit organizer, or in another embodiment using other paper or an other writing implement from another source, the child writes a note to the tooth fair. At step 620 the child may open the tube, and place their tooth and note inside (such as in chambers 313 and 312 respectively) and close the tube. In an embodiment, the child may use the writing implement (e.g. pen, pencil, marker) to roll the note, and then place the tightly wound paper roll inside the tube, through the hole in the bottom of the tube. In another embodiment, the tube 130 has a closed end for the note chamber 312, and so the child may place the tooth and note in the open tube then close it. At step 625 they place the filled tube for collection under their pillow, whereby in step 635 the "tooth fairy" collects the tooth and leaves a treat in exchange (a treat can be money, candy, or any reward as per traditions of the household). Then at step 640, if the tooth that has fallen out was not the child's last tooth, in other words, are there more baby teeth for the child to lose? If the answer is "yes," then the process repeats starting at step 605, until all the teeth have fallen out or the answer to step 640 is "no." The process then goes to step 645 where the child writes the tooth fairy a note and may for example, place this note under their pillow, telling the tooth fairy they changed their mind, and would actually love all the teeth and notes back. At step 650, the tooth fairy returns the filled tubes. In an embodiment, the child places the tubes back in the apparatus, in order, from 1 to 20, matching the tube number with associated slot number. In another embodiment, the caregiver returns all of the tubes into the organizer and returns the filled organizer back to the child. In an optional step 655, the child may then give the filled kit (organizer) back to the caregiver as a sentimental keepsake of the child's youth. The foregoing description of the preferred embodiments has been presented for purposes of illustration and description. It is not intended to be exhaustive or to limit the embodiments to the precise form or to exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the embodiments and its best mode practical application, thereby to enable others skilled in the art to understand the various embodiments and with various modifications as are suited to the particular use or implementation contemplated. It is intended that the scope of the embodiments be defined by the claims appended hereto and their equivalents. Reference to an element in the singular is not intended to mean "one and only one" unless explicitly so stated, but rather means "one or more." Moreover, no element, component, nor method step in the described disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

In addition, the conjunction "and" when used in the claims is meant to be interpreted as follows: "X, Y and Z" means it can be either X, Y or Z individually, or it can be both X and Y together, both X and Z together, both Y and Z together, or all of X, Y, and Z together.

It should be understood that the figures illustrated in the attachments, which highlight the functionality and advantages of the described embodiments, are presented for example purposes only. The architecture of the described embodiments are sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the described embodiments in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. A process or method may be implemented with a processor, or similar device, or any combination of hardware and software.

The various features of the embodiments described herein can be implemented in different systems without departing from the embodiments. It should be noted that the foregoing embodiments are merely examples and are not to be construed as limiting the embodiments. The description of the embodiments is intended to be illustrative, and not to limit the scope of the claims. As such, the described teachings can be readily applied to other types of apparatuses and many alternatives, modifications, and variations will be apparent to those skilled in the art.

What is claimed is:

1. A baby tooth storage kit, comprising:
    a baby tooth storage unit comprising a base and a cover, the base containing a tube holder;
    a plurality of oblong tubes, each tube is configured for storing a baby tooth and a note, wherein each tube comprises a first chamber and a second chamber, wherein the first chamber is located at a lower end of the tube, with a bottom of the lower end having an opening, and the first chamber being configured to house a rolled paper note which is insertable through the bottom opening, and wherein the second chamber is located at the upper end of each tube, wherein the second chamber is fully enclosed and configured to house a baby tooth, and each tube has an open position and a closed position;
    a writing implement;
    a plurality of notes; and
    wherein the tube holder contains the plurality of tubes, the writing implement, and the plurality of notes.

2. The baby tooth storage kit of claim 1, further comprising, a unique set of instructions comprising the steps of losing a baby tooth;

removing a tube from the baby tooth storage unit;
writing a note to the "tooth fairy;"
opening the tube;
placing the baby tooth and the note inside the tube;
placing the filled tube under a pillow;
collecting the filled tube;
leaving a reward in exchange for the collected filled tube;
repeating the above steps until all the desired baby teeth are collected;
writing a note to the "tooth fairy" requesting all of the collected teeth back; and
returning the baby tooth storage unit, the unit holding the requested filled tubes.

3. The baby tooth storage kit of claim 1, wherein the baby tooth storage unit is shaped to resemble a tooth.

4. The baby tooth storage kit of claim 1, wherein the plurality of tubes are between 1 to 20 tubes.

5. The baby tooth storage kit of claim 1, wherein the plurality of tubes are labeled on their top lateral surface with a number, symbol, character, or word.

6. The baby tooth storage kit of claim 1, wherein the plurality of tubes are labeled with the numbers 1 through 20.

7. The baby tooth storage kit of claim 1, wherein the cover is removably secure securable to the base.

8. The baby tooth storage kit of claim 1, wherein the tube holder comprises a circular disc with cutouts housing the plurality of tubes, writing implement, and plurality of notes.

* * * * *